United States Patent [19]
Pope

[11] 3,796,551
[45] Mar. 12, 1974

[54] REACTION CHAMBER CONSTRUCTION FOR THE CHLORINATION OF ALUMINA

[75] Inventor: Roy M. Pope, Maryville, Tenn.

[73] Assignee: Aluminum Company of America, Pittsburgh, Pa.

[22] Filed: Sept. 14, 1971

[21] Appl. No.: 180,373

[52] U.S. Cl............... 23/284, 34/57 A, 34/10, 432/58, 423/495, 23/277 R
[51] Int. Cl............... B01j 9/18, B01j 9/24
[58] Field of Search............... 23/284, 288 S, 277 R; 34/57 R, 57 A, 10; 263/21 A; 75/9, 26; 423/495, 496

[56] References Cited
UNITED STATES PATENTS

| | | | |
|---|---|---|---|
| 3,188,173 | 6/1965 | Hughes et al. | 23/284 X |
| 2,973,252 | 2/1961 | Shields et al. | 196/133 X |
| 2,760,917 | 8/1956 | Ward | 23/288 S X |

FOREIGN PATENTS OR APPLICATIONS

| | | | |
|---|---|---|---|
| 740,974 | 11/1955 | Great Britain | 23/284 |

OTHER PUBLICATIONS

Oliver, Chem. Engineering, Sept, 1952, pp. 276 and 278, (The) Corrosion Forum.

*Primary Examiner*—James H. Tayman, Jr.

[57] ABSTRACT

Construction for a fluidized bed reaction chamber for the chlorination of alumina bearing material including means for effecting the introduction of a central reactant gas stream through a centrally disposed porous gas distribution body and a perimetrically confining reactant gas stream through perimetrically disposed direct flow nozzle system serving as a flowing boundary curtain adjacent a carbon wall backed by compacted high density alumina to minimize undesired flow of reactant chlorine gas through the reaction chamber walls.

2 Claims, 1 Drawing Figure

PATENTED MAR 12 1974 3,796,551
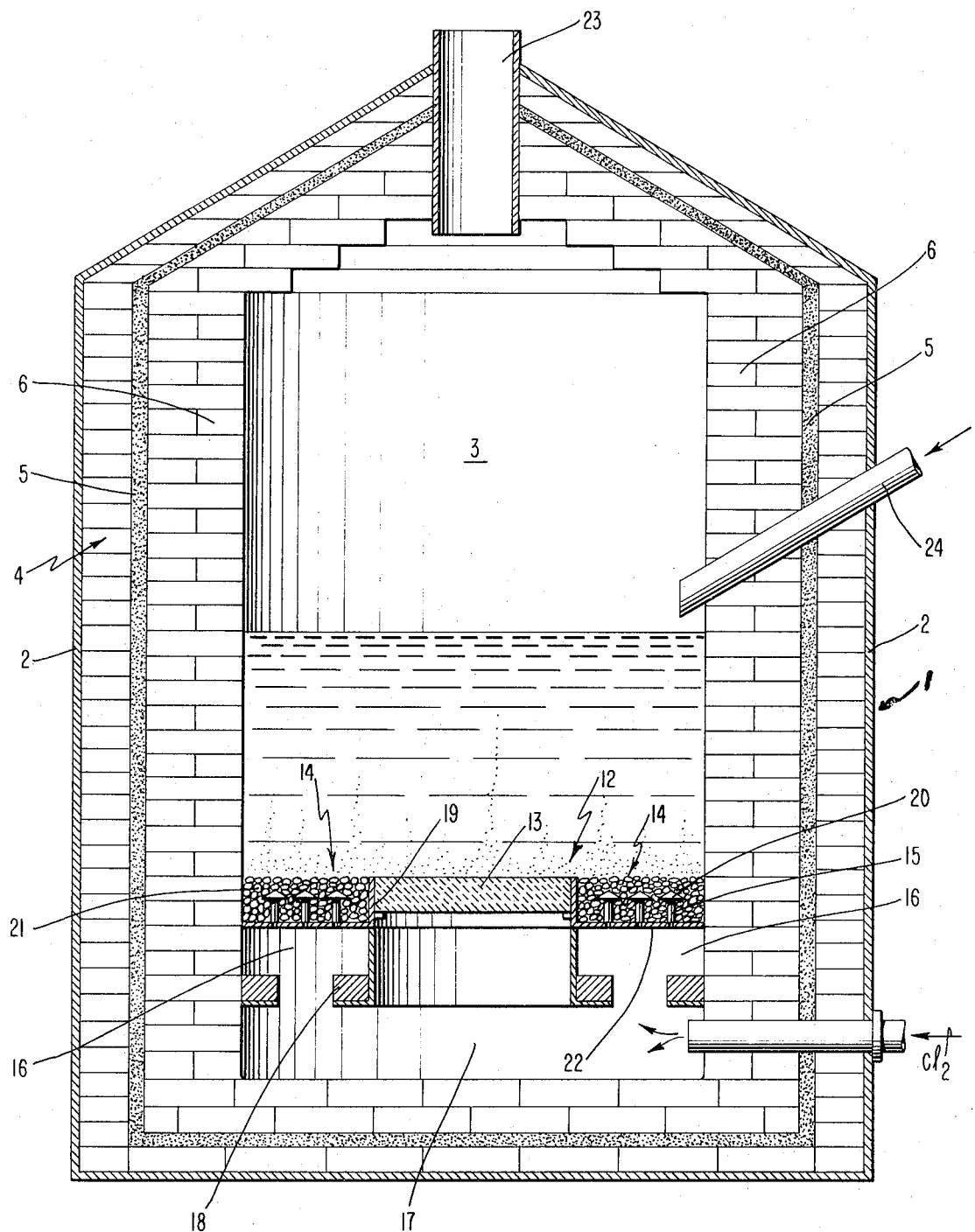
INVENTOR.
ROY M. POPE
BY
ATTORNEY

REACTION CHAMBER CONSTRUCTION FOR THE CHLORINATION OF ALUMINA

The present invention relates to the controlled flow of corrosive gas in an improved construction for a fluidized bed reaction chamber and more particularly to an improved construction for a fluidized bed reaction chamber for the chlorination of alumina bearing material in the production of aluminum chloride.

Although the potential advantages of utilizing aluminum chloride as a source material in the electrolytic production of aluminum have long been recognized, commercial realization thereof has been precluded by the inability of the art both to provide aluminum chloride of sufficiently high purity as to be utilizable therein and to provide aluminum chloride in any significant required quantity therefor in an economically acceptable manner. The long standing incentive and need for economically producible high purity aluminum chloride has resulted in extensive experimental exploration and evaluation of numerous suggested expedients for obtaining such long desired result. However, to date none of these suggested expedients has succeeded in satisfying the desired objective of commercial quantity production of economically producible high purity aluminum chloride.

Among the many problems attendant the economic production of aluminum chloride is the provision of a reaction chamber for the chlorination reaction that can effectively withstand the highly penetrant action of corrosive chlorine gas at elevated temperatures without utilization of materials that will deleteriously effect the basic reaction or undesirably contaminate the resultant product.

This invention may be briefly described as an improved construction for a fluidized bed reaction chamber for the chlorination of alumina bearing materials that minimizes, if not effectively avoids, the deleterious seepage of highly penetrant high temperature chlorine gas through a non-contaminating chamber lining. In its broader aspects the subject invention includes the provision of a composite multilayer lining for the reaction chamber in conjunction with a selectively directed flow of reactant gas adjacent to the reaction chamber wall and perimetrically confining a main reactant gas stream to effectively sweep the chamber defining lining and maintain a selectively oriented pressure drop inducing gas flow countercurrent to a lining penetrating flow thereof.

Among the advantages of the subject invention is the provision of a reaction chamber for the continuous chlorination of alumina bearing material of extended operating life.

The object of this invention is the provision of an improved construction for a fluidized bed reaction chamber for the chlorination of alumina bearing material.

Other and further objects of the invention will become apparent from the following portions of this specification and from the accompanying drawing which, in accord with the mandate of the statute, illustrates the principles of the invention as embodied in a presently preferred embodiment thereof.

Referring to the drawing:

FIG. 1 is a schematic vertical sectional view of a fluidizing bed reaction chamber constructed in accord with the principles of this invention.

Referring to the drawing, there is illustrated a fluidized bed reaction chamber 1 for the chlorination of alumina or alumina bearing material constituted of an external metal shell 2 and a multilayer lining defining a generally cylindrically shaped reaction bed area 3. The multilayer lining suitably comprises an outer course of high temperature refractory 4 and which may constitute one or more layers, an intermediate layer 5 of compacted finely divided material that is inert to chlorine at the elevated operating temperature, suitably high density alumina having a bulk density of about 140 pounds per cubic foot, and a multilayer inner course 6 of stacked blocks of baked carbon, desirably of a character similar to that employed as anode material in aluminum electrolytic reduction cells.

The bottom of the fluidized bed chamber comprises a gas distribution inlet assembly, generally designated 12, for effecting the controlled introduction of chlorine reactant gas thereinto.

Such gas distribution assembly 12 comprises a central randomly permeable porous gas distribution plate or member 13 for effecting the introduction of a central corrosive gas stream of selective diffuse character and cross-section to fluidize a particulate bed of alumina-bearing material to be maintained in chamber 3 and to react therewith. Such distribution member 13 is preferably mounted in a supporting ring 19 and additionally serves as a removable manhole cover for access to the interior of the vessel. The main gas distribution body 13 is preferably in the form of a block or plate of porous silica having an appreciable thickness or depth relative to its cross-sectional dimension and is centrally disposed in the chamber. The described randomly porous gas distribution plate will operatively function to provide a myriad of individual tortuous gas passages therethrough and will effect the subdivision of the main gas stream into a multiplicity of individual discrete streams of diminutive cross-section that will compositely constitute the core stream. Perimetrically disposed about the main gas distribution plate 13 is an annular secondary gas distribution assembly, generally designated 14. Such secondary distribution assembly 14 laterally confines the main gas flow distribution block 13 and effect issuance of a perimetrically confining stream of corrosive reactant gas in the form of a confining boundary curtain around the central corrosive gas stream and in concurrent direction therewith to additionally sweep the surface of the inner course of lining 6.

The perimetrically disposed secondary distribution assembly 14 is arranged to provide a composite flow of substantially uniform radial dimension and, for the described circular main distribution block 13, will be in the form of a perimetric annulus disposed thereabout. Such assembly 14 may, as shown in FIG. 1, be constituted by a plurality of arcuate slots or by a plurality of individual nozzles 15 fed through the annular distributor chamber 16, connected to the main fluidizing reactant gas supply chamber 17 through a plurality of channels 18. In particular, the nozzles 15 are operatively distributed throughout the cross-sectional area of the space between the inner lining course 6 and the periphery of the distribution block 13, and are preferably surmounted by bubble caps 20 and other diffusing means 21 to effect a radial diffusion of the emitted gas and convert the separately issued streams into a stream of upwardly moving gas. The bubble cap-surmounted nozzles can be composed substantially of quartz, graphite, alumina, silicon-carbide, silicon oxynitride, nickel alloys, or the like, for example, to withstand the vigorous reaction conditions, and especially the high temperatures which may be generated during the exothermic chlorination reaction to be carried out in the chamber.

In accordance with a preferred feature of the invention, the diffusing means 21 comprises a bed of loosely packed porous refractory spheres, as for example composed substantially of calcined alumina, supported by the plate 22 and loosely packed about the nozzles 15, to insulate the nozzles from the heat generated by the reaction, e.g. the exothermic chlorination of alumina bearing material, and to more uniformly distribute the emitted gas throughout the operative flow cross-sectional area of such nozzle means.

The reactor chamber 1 also includes a gaseous effluent outlet 23 remote from the gas distribution inlet for removal of the effluent gases from the system, and can have material inlet means schematically shown at 24, of conventional character to permit introduction of other reactants and the fluidized bed particles.

The reactor chamber 1 also includes a gaseous effluent outlet 23 remote from the gas distribution inlet for removal of the effluent gases from the system, and can have material inlet means schematically shown at 24, of conventional character to permit introduction of other reactants and the fluidized bed particles.

In the operation of the described unit, a central stream of corrosive chlorine gas made of a multiplicity of uniformly distributed individually constituted diffuse gas streams of small cross-sectional extent will be introduced into the fluidized bed reaction zone 3 through the main gas distribution plate 13. This central stream will be perimetrically bounded by a concurrent secondary stream of reactant gas moving at a slightly higher velocity and serving as a boundary curtain to laterally confine the central corrosive gas stream and to sweep the face of the inner lining course 6 in the reaction zone.

Although not fully understood at the present time, it is believed that the described construction and use of the composite multielement core stream and perimetrically confining secondary stream not only effects an enhanced fluidization of the bed with both beneficial effects upon the reaction proceeding therein but also maintains a preferential pressure differential relationship adjacent the lining surface to selectively direct the flow of penetrant chlorine gas along the surface of and not into the lining with a concomitant extension of the life of the reaction vessel.

It will be appreciated that the instant specification and drawing are set forth by way of illustration and not limitation, and that various modifications and changes may be made without departing from the spirit and scope of the present invention which is to be limited only by the scope of the appended claims.

What is claimed is:

1. A fluidized bed reaction chamber for the high temperature chlorination of alumina bearing material by gaseous chlorine comprising
    a perimetric metal shell,
    a multilayered inner lining wall of baked carbon disposed within said shell and peripherally defining a chlorination reaction zone,
    a compacted layer of finely divided
    high density chlorine inert alumina with a bulk density of at least 140 pounds per cubic foot disposed intermediate said multilayered carbon lining wall and said perimetric shell, and
    a fluidized bed confining floor including
    a centrally disposed solids impervious and randomly porous plate of silica for randomly diffuse passage of a chlorine gas stream therethrough and issuance therefrom as a composite gas stream of selective flow cross-section, and
    a peripherally disposed secondary gas distribution assembly including loosely packed porous refractory spheres for the diffused issuance
    of a concurrently moving composite perimetric stream of chlorine for sweeping said carbon lining wall, said compacted layer of chlorine inert high density alumina having a pressure drop thereacross greater than that of the fluidized bed in said reaction chamber.

2. A fluidized bed reaction chamber for the chlorination of alumina bearing material comprising
    a perimetric shell,
    an inner lining wall of carbon disposed within said shell and peripherally defining a chlorination reaction zone,
    a layer of finely divided compacted material that is inert to chlorine disposed intermediate said inner carbon lining wall and said perimetric shell, and
    a fluidized bed confining floor including
    a centrally disposed solids impervious randomly porous gas distribution body for issuance of a core chlorine gas stream of selective flow cross-section, and
    a peripherally disposed secondary gas distribution assembly including a plurality of spaced apart bubble cap-surmounted nozzles surrounded by porous refractory spheres loosely packed thereabout for issuance of a concurrently moving perimetric stream of reactant gas for sweeping said carbon lining wall, said layer of chlorine inert material having a greater pressure drop thereacross than that of said fluidized bed.

* * * * *